(12) United States Patent
Cothran et al.

(10) Patent No.: US 9,610,706 B2
(45) Date of Patent: *Apr. 4, 2017

(54) POWDERED LIGNIN

(71) Applicant: Georgia-Pacific Chemicals LLC, Atlanta, GA (US)

(72) Inventors: John D. Cothran, Conyers, GA (US); Feng Jing, Snellville, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/607,101

(22) Filed: Jan. 28, 2015

(65) Prior Publication Data

US 2015/0210845 A1    Jul. 30, 2015

Related U.S. Application Data

(60) Provisional application No. 61/932,330, filed on Jan. 28, 2014.

(51) Int. Cl.
*B27N 1/02* (2006.01)
*C09J 197/00* (2006.01)
*B27N 3/00* (2006.01)

(52) U.S. Cl.
CPC ............... *B27N 1/02* (2013.01); *B27N 3/002* (2013.01); *C09J 197/005* (2013.01)

(58) Field of Classification Search
CPC ......... B27N 1/02; B27N 3/002; C09J 197/005
See application file for complete search history.

(56) References Cited

U.S. PATENT DOCUMENTS

| | | | |
|---|---|---|---|
| 2,492,510 A | 12/1949 | Epps | |
| 2,507,465 A | 5/1950 | Ayers | |
| 2,781,286 A | 2/1957 | Ayers et al. | |
| 3,268,460 A * | 8/1966 | Miller | C09J 161/06 524/596 |
| 3,285,805 A | 11/1966 | Bryner | |
| 3,957,703 A | 5/1976 | Ludwig et al. | |
| 4,070,314 A | 1/1978 | Alexander et al. | |
| 4,244,846 A | 1/1981 | Edler | |
| 4,778,530 A | 10/1988 | Ayers | |
| 5,173,527 A * | 12/1992 | Calve | C09J 161/06 524/72 |
| 6,497,760 B2 | 12/2002 | Sun et al. | |
| 2005/0250900 A1* | 11/2005 | Stofko | B05B 3/02 524/594 |

FOREIGN PATENT DOCUMENTS

| | | | | |
|---|---|---|---|---|
| CA | 1136793 | * | 11/1982 | ............. C08L 97/00 |
| WO | WO 2011/097719 | * | 8/2011 | ............. C09J 197/00 |

OTHER PUBLICATIONS

Dolenko et al. Resin Binders From Kraft Lignin. Forest Products Journal. vol. 28, No. 8. Aug. 1978.*
Walter J. Wolf, "Kirk-Othmer, Encyclopedia of Chemical Technology", Fourth Edition, vol. 22, pp. 591-619, 1997.

* cited by examiner

*Primary Examiner* — John Uselding
(74) *Attorney, Agent, or Firm* — Ram W. Sabnis

(57) ABSTRACT

Lignin-containing mixtures and methods for making and using same. The lignin-containing mixture can include one or more lignin materials and one or more phenol-aldehyde resins. The mixture can include less than 10 wt % of water.

20 Claims, No Drawings

POWDERED LIGNIN

CROSS-REFERENCE TO RELATED APPLICATION

This application claims priority to U.S. Provisional Patent Application No. 61/932,330, filed Jan. 28, 2014, which is incorporated by reference herein.

FIELD

Embodiments described generally relate to mixtures or blends that contain one or more lignins and one or more phenol-aldehyde resins and methods for making and using same. More particularly, the embodiments described relate to mixtures or blends that contain one or more powdered lignins and one or more powdered phenol-aldehyde resins, where the mixture or blend contains less than 10 wt % of water.

BACKGROUND

Lignin is a wood-derived polyphenol polymer that is produced as a by-product from the kraft wood pulping process. Typically, "black liquor" obtained from the kraft process is separated from the remaining wood pulp and then kraft lignin is isolated from the black liquor by any number of methods. Kraft lignin is a macromolecule comprising a variety of functional groups, including phenol, methoxy, ether, and alcohol moieties. Kraft lignin has found use in adhesive mixtures for engineered wood materials. Powdered lignin, e.g., kraft lignin, however, is an explosive compound at moisture contents of less than 10 wt %, making powdered lignin dangerous to handle and prepare.

Powdered or particulate, curable aldehyde based resins, e.g., phenol-formaldehyde (PF) resins, have found wide use as an adhesive for a variety of lignocellulose composite products such as oriented strand board (OSB) and other wafer or chip board products. Reaction products produced by the reaction of lignin and PF resins have also been tested as adhesives for similar wood composite products. The commercial use of low-moisture content lignin, however, is limited by the explosive properties as described above.

There is a need, therefore, for compositions that include one or more powdered lignins having a moisture content of less than 10 wt % that are stable for handling, processing, and/or transport.

SUMMARY

Lignin-containing mixtures and methods for making and using same are provided. In at least one specific embodiment, a lignin-containing mixture can include a lignin material and a phenol-aldehyde resin. The mixture can include less than 10 wt % of water.

In at least one specific embodiment, a lignin-containing mixture can include a powdered kraft lignin and a powdered phenol-formaldehyde resin. The powdered kraft lignin can include less than 10 wt % of water and have an average particle size of about 1 μm to about 80 μm. The powdered phenol-formaldehyde resin can include less than 10 wt % of water and have an average particle size of about 20 μm to about 200 μm. The mixture can include less than 10 wt % of water. A weight ratio of the powdered kraft lignin to the powdered phenol-formaldehyde resin can be about 5:95 to about 50:50, based on a dry weight of the mixture. The mixture can have an explosion constant ($K_{st}$) of less than 300 bar m/s and a minimum ignition energy (MIE) of at least 100 mJ.

In at least one specific embodiment, a method for making a lignin-containing mixture can include mixing a lignin material and a phenol-aldehyde resin to produce a mixture. The mixture can include less than 10 wt % of water.

DETAILED DESCRIPTION

It has been surprisingly and unexpectedly discovered that mixing, blending, or otherwise combining one or more lignin materials, e.g., kraft lignin, and one or more phenol-aldehyde resins, e.g., phenol-formaldehyde resin, produces or forms a lignin-containing mixture or simply "mixture" that is significantly less explosive or has a significantly reduced explosivity when the mixture contains less than 10 wt % water as compared to the one or more lignin materials alone when the one or more lignin materials alone contain less than 10 wt % of water. The one or more lignin materials and/or the one or more phenol-aldehyde resins can be in the form of a particulate or powder. It has also been surprisingly and unexpectedly discovered that the lignin material, e.g., kraft lignin, can be mixed, blended, or otherwise combined with an aqueous solution or dispersion of a phenol-aldehyde resin, e.g., phenol-formaldehyde resin, to produce an aqueous mixture that can be dried, e.g., spray-dried, to produce a powdered mixture that contains less than 10 wt % of water that is significantly less explosive or has a significantly reduced explosivity as compared to the powdered lignin material alone when the powdered lignin material alone contains less than 10 wt % of water.

As used herein, the term "reduced explosivity" refers to a mixture that includes the phenol-aldehyde resin and the lignin material, where the mixture has a water content of less than 10 wt % that is less explosive than the lignin material alone, i.e., a neat lignin material that does not include the powdered phenol-aldehyde resin, where the lignin material alone also has a water content of less than 10 wt %. The mixture that includes the phenol-aldehyde resin and the lignin material and has a water content of less than 10 wt % can be safer to handle as compared to the neat, lignin material alone that has a water content of less than 10 wt %. The reduced explosivity can also reduce the capital investment required to handle the lignin blend as compared to the neat, powdered lignin material alone.

The mixture that includes the lignin material and the phenol-aldehyde resin and contains less than 10 wt % of water can have an explosive constant ($K_{st}$) of less than 299 bar m/s and a minimum ignition energy (MIE) of greater than 100 mJ. The explosive constant ($K_{st}$), in units of pressure-distance over time, is a measure of the dust explosion severity for a given dust. The explosive constant ($K_{st}$) for a given dust can be calculated as the maximum rate of pressure rise multiplied by the cube root of the volume in which the dust was combusted in. The minimum ignition energy (MIE) is the lowest quantity of electrical energy stored in a capacitor that when discharged is just sufficient to ignite a given dust concentration in air. The minimum ignition energy (MIE) can be carried out at atmospheric temperature and pressure. The explosive constant ($K_{st}$) and the minimum ignition energy (MIE) of a given particulate or powdered material, e.g., a powdered lignin material or a mixture that includes a powdered lignin material and a powdered phenol-aldehyde resin, can be measured according to the ASTM E-1226-12A and ASTM E-2019-03(2013) standardized tests, respectively, in a 20 L sphere. Additional properties of a given particulate or powdered material can be measured according to the ASTM E-1491-06(2012), ASTM E-2021-09(2013), and ASTM E-1515-07 standardized tests in a 20 L sphere.

The mixture that includes the lignin material and the phenol-aldehyde resin and contains less than 10 wt % of water can have an explosion constant ($K_{st}$) from a low of about 0 bar m/s, about 25 bar m/s, about 50 bar m/s, about 75 bar m/s, about 100 bar m/s, or about 125 bar m/s to a high of about 150 bar m/s, about 175 bar m/s, about 200 bar m/s, about 225 bar m/s, about 250 bar m/s, about 275 bar m/s, or about 298 bar m/s. For example, the mixture can have an explosion constant ($K_{st}$) of about 0 bar m/s to about 295 bar m/s, about 5 bar m/s to about 275 bar m/s, about 10 bar m/s to about 250 bar m/s, about 50 bar m/s to about 150 bar m/s, about 75 bar m/s to about 175 bar m/s, about 125 bar m/s to about 200 bar m/s, about 175 bar m/s to about 240 bar m/s, about 220 bar m/s to about 280 bar m/s, or about 125 bar m/s to about 190 bar m/s. In another example, the mixture can have an explosion constant of less than 299 bar m/s, less than 200 bar m/s, less than 100 bar m/s, or less than 50 bar m/s.

The mixture that includes the lignin material and the phenol-aldehyde resin and contains less than 10 wt % of water can have a minimum ignition energy (MIE) from a low of about 100 mJ, about 150 mJ, about 200 mJ, about 250 mJ, about 300 mJ, or about 350 mJ to a high of about 400 mJ, about 500 mJ, about 650 mJ, about 800 mJ, about 1,000 mJ, about 1,100 mJ or more. For example, the mixture can have a minimum ignition energy (MIE) of about 110 mJ to about 400 mJ, about 175 mJ to about 550 mJ, about 275 mJ to about 700 mJ, about 450 mJ to about 950 mJ, about 550 mJ to about 1,050 mJ, or about 700 mJ to about 1,150 mJ. In another example, the mixture can have a minimum ignition energy (MIE) of at least 100 mJ, at least 250 mJ, at least 350 mJ, at least 500 mJ, at least 700 mJ, at least 850 mJ, or at least 1,000 mJ. In another example, the mixture can have a minimum ignition energy (MIE) of greater than 100 mJ, greater than 200 mJ, greater than 300 mJ, greater than 400 mJ, greater than 500 mJ, greater than 600 mJ, greater than 700 mJ, greater than 800 mJ, or greater than 900 mJ. In another example, the mixture can have a minimum ignition energy (MIE) of at least 100 mJ, at least 250 mJ, at least 350 mJ, at least 500 mJ, at least 700 mJ, at least 850 mJ, or at least 1,000 mJ and up to about 1,500 mJ, about 2,000 mJ, about 3,000 mJ, about 4,000 mJ, about 5,000 mJ, about 6,000 mJ, about 7,000 mJ, about 8,000 mJ, about 9,000 mJ, or about 10,000 mJ.

In one or more embodiments, the mixture that includes the lignin material and the phenol-aldehyde resin and contains less than 10 wt % of water can have an explosion constant of less than 299 bar m/s, less than 200 bar m/s, less than 175 bar m/s, less than 150 bar m/s, less than 100 bar m/s, or less than 50 bar m/s and a minimum ignition energy (MIE) of greater than 100 mJ, greater than 200 mJ, greater than 300 mJ, greater than 400 mJ, greater than 500 mJ, greater than 600 mJ, greater than 700 mJ, greater than 800 mJ, or greater than 900 mJ. For example, the mixture can have an explosion constant ($K_{st}$) of about 0 bar m/s to about 295 bar m/s, about 5 bar m/s to about 275 bar m/s, about 10 bar m/s to about 250 bar m/s, about 50 bar m/s to about 150 bar m/s, about 75 bar m/s to about 175 bar m/s, about 125 bar m/s to about 200 bar m/s, about 175 bar m/s to about 240 bar m/s, about 220 bar m/s to about 280 bar m/s, or about 125 bar m/s to about 190 bar m/s and a minimum ignition energy (MIE) of about 110 mJ to about 400 mJ, about 175 mJ to about 550 mJ, about 275 mJ to about 700 mJ, about 450 mJ to about 950 mJ, about 550 mJ to about 1,050 mJ, or about 700 mJ to about 1,150 mJ. In another example, the mixture can have an explosion constant of less than 299 bar m/s, less than 200 bar m/s, less than 100 bar m/s, or less than 50 bar m/s and a minimum ignition energy (MIE) of about 1,000 mJ to about 10,000 mJ. In another example, the mixture can have an explosion constant ($K_{st}$) of about 50 bar m/s to about 295 bar m/s and a minimum ignition energy (MIE) of about 1,000 mJ to about 10,000 mJ. In another example, the mixture can have an explosion constant ($K_{st}$) of about 100 bar m/s to about 200 bar m/s and a minimum ignition energy (MIE) of about 1,000 mJ to about 10,000 mJ.

The mixture that includes the lignin material and the phenol-aldehyde resin can have a water or moisture content of less than 20 wt %, less than 15 wt %, less than 10 wt %, less than 7 wt %, less than 6 wt %, less than 5 wt %, less than 4 wt %, less than 3 wt %, less than 2 wt %, or less than 1 wt %, based on the total weight of the mixture. For example, the mixture can have a water or moisture content of about 0.5 wt % to about 3 wt %, about 1 wt % to about 2 wt %, about 0.5 wt % to about 1.5 wt %, about 1.5 wt % to about 3.5 wt %, about 1 wt % to about 2.5 wt %, about 0.7 wt % to about 3.5 wt %, about 3 wt % to about 6 wt %, about 4 wt % to about 8 wt %, about 5 wt % to about 7 wt %, about 6 wt % to about 9 wt %, or about 1 wt % to about 9.5 wt %, based on the total weight of the mixture. As used herein, the term "moisture content" of a material is synonymous with the water content of a material. For example, a lignin material, e.g., kraft lignin, having a moisture content of less than 10 wt % of the lignin material is equivalent to a lignin material with a water content of less than 10 wt % of the lignin material. The water or moisture content of a sample, e.g., the lignin material, the phenol-aldehyde resin, or the mixture that includes the lignin material and the phenol-aldehyde resin, can be measured by determining the weight loss upon heating a small sample, e.g., 5-8 grams of the sample, to a suitable temperature, e.g., 105° C., and a time sufficient to remove the water therefrom. By measuring the weight of the sample before and after heating, the percent of moisture in the sample can be directly calculated or otherwise estimated.

In one or more embodiments, the amount of the lignin material in the mixture can be from a low of about 1 wt %, about 5 wt %, about 10 wt %, about 15 wt %, about 20 wt %, about 25 wt %, or about 30 wt % to a high of about 35 wt %, about 40 wt %, about 45 wt %, about 50 wt %, about 55 wt %, or about 60 wt %, based on the combined weight of the lignin material and the phenol-aldehyde resin. For example, the mixture can include about 1 wt % to about 15 wt %, about 10 wt % to about 20 wt %, about 40 wt % to about 70 wt %, about 5 wt % to about 60 wt %, about 10 wt % to about 50 wt %, about 25 wt % to about 50 wt %, about 30 wt % to about 50 wt %, or about 40 wt % to about 50 wt %, based on the combined weight of the lignin material and the phenol-aldehyde resin. In another example, the amount of the lignin material in the mixture can be at least 10 wt %, at least 20 wt %, at least 25 wt %, at least 30 wt %, or at least 35 wt % and up to about 40 wt %, about 45 wt %, about 50 wt %, about 55 wt %, or about 60 wt %, based on the combined weight of the lignin material and the phenol-aldehyde resin.

In one or more embodiments, the amount of the lignin material in the mixture can be from a low of about 1 vol %, about 5 vol %, about 10 vol %, about 15 vol %, about 20 vol %, about 25 vol %, or about 30 vol % to a high of about 35 vol %, about 40 vol %, about 45 vol %, about 50 vol %, about 55 vol %, or about 60 vol %, based on the combined volume of the lignin material and the phenol-aldehyde resin.

For example, the mixture can include about 1 vol % to about 15 vol %, about 10 vol % to about 20 vol %, about 40 vol % to about 70 vol %, about 5 vol % to about 60 vol %, about 10 vol % to about 50 vol %, about 25 vol % to about 50 vol %, about 30 vol % to about 50 vol %, or about 40 vol % to about 50 vol %, based on the combined volume of the lignin material and the phenol-aldehyde resin. In another example, the amount of the lignin material in the mixture can be at least 10 vol %, at least 20 vol %, at least 25 vol %, at least 30 vol %, or at least 35 vol % and up to about 40 vol %, about 45 vol %, about 50 vol %, about 55 vol %, or about 60 vol %, based on the combined weight of the lignin material and the phenol-aldehyde resin.

In one or more embodiments, the weight ratio, volume ratio, and/or molar ratio of the lignin material to the phenol-aldehyde resin in the mixture can be from a low of about 1:99, about 1:19, about 1:7.5, about 1:1.5, or about 1:1 to a high of about 1:0.7, about 1:0.5, about 1:0.3, about 1:0.1, about 1:0.07, about 1:0.05, about 1:0.03, or about 1:0.01. For example, the weight ratio, volume ratio, and/or molar ratio of the lignin material to the phenol-aldehyde resin in the mixture can be about 1:99 to about 99:1, about 5:95 to about 95:5, about 10:75 to about 75:10, about 2:3 to about 3:2, about 1:3 to about 3:1, about 1:2 to about 2:1, or about 1:1. 1:99 to about 99:1, about 5:95 to about 95:5, about 10:75 to about 75:10, about 2:3 to about 3:2, about 1:3 to about 3:1, about 1:2 to about 2:1, about 1:1 to about 1:1.5, or about 1.5:1 to about 1:1.

In one or more embodiments, the lignin material and the phenol-aldehyde resin in the mixture can remain as separate or discrete components that have not reacted to form a reaction product. For example, the lignin material and the phenol-aldehyde resin cannot be represented by a single chemical formula, the lignin material and the phenol-aldehyde resin can be heterogeneously associated with one another, the lignin material and the phenol-aldehyde resin may or may not be uniformly dispersed together, and the lignin material and the phenol-aldehyde resin can be mechanically separated from one another. When the lignin material and the phenol-aldehyde resin are blended, mixed, or otherwise combined with one another to produce the mixture, the lignin material and the phenol-aldehyde resin can be combined under conditions that do not promote or cause the two components to react or form a reaction product. For example, when the lignin material and the phenol-aldehyde resin are blended, mixed, or otherwise combined with one another at room temperature, e.g., about 25°, and room pressure, e.g., about 101 kPa, to produce the mixture, the two components can remain as separate or discrete components that do not react to form a reaction product.

In one or more embodiments, the mixture that includes the lignin material and the phenol-aldehyde resin and contains less than 10 wt % of water can be mixed with water, where the lignin material and the phenol-aldehyde resin can be dispersed or suspended in the water to produce an aqueous dispersion or suspension. An aqueous dispersion or suspension that includes about 25 wt % of the mixture, where the mixture includes about 50 wt % to about 95 wt % of the phenol-aldehyde resin and about 5 wt % to about 50 wt % of the lignin material, based on the combined weight of the phenol-aldehyde resin and the lignin material, can have a pH from a low of about 7, about 8, about 9, or about 10 to a high of about 11, about 12, about 13, or about 14. For example, the pH of the dispersion or suspension that includes about 25 wt % of the mixture, where the mixture includes about 85 wt % of the phenol-aldehyde resin and about 15 wt % of the lignin material, based on the combined weight of the phenol-aldehyde resin and the lignin material, can be from about 7 to about 14, about 8 to about 13, or about 9 to about 12.5. In another example, the pH of the dispersion or suspension that includes about 25 wt % of the mixture, where the mixture includes about 70 wt % of the phenol-aldehyde resin and about 30 wt % of the lignin material, based on the combined weight of the phenol-aldehyde resin and the lignin material, can be at least 8, at least 8.5, at least 9, at least 9.5, or at least 10 and less than 13, less than 12.5, less than 12, less than 11.5, less than 11, or less than 10.5. The pH of the dispersion or suspension can be measured at a temperature of about 25° C. with an Orion 2Star pH meter from ThermoScientific. The pH meter can be equipped with a combination electrode that has been calibrated with standard solutions at a pH of 7.0 and a pH of 10.0 pH. About 50 grams of powder can be placed in a 500 ml beaker. About 150 grams of deionized water can be added to the powder. The slurry can be mechanically agitated until a uniform dispersion of the powder in water has been made. The dispersion can be allowed to stand at ambient conditions for about 5 minutes without agitation. The pH reading can then made by immersing the electrode in the dispersion.

As used herein, the term "lignin material" refers to any polymeric material that is or includes lignin. In one or more embodiments, the lignin material may can be or include lignin as extracted from black liquor; hereinafter "kraft lignin"). In one or more embodiments, the naturally occurring kraft lignin can be chemically modified during precipitation from black liquor. In one or more embodiments, the naturally occurring kraft lignin can be chemically modified prior to precipitation from black liquor. In one or more embodiments, naturally occurring lignin that has been chemically modified can include, but is not limited to, one or more organic functional groups and/or one or more inorganic functional groups. Illustrative organic functional groups can include, but are not limited to, carboxyl, carbonyl, and alkenyl. Illustrative inorganic functional groups can include, but are not limited to, sodium, sulfate, and potassium. In one or more embodiments, the lignin material can be partially or entirely of a synthetic nature. In other words, the lignin material can be lignin material that is not obtained directly or indirectly from a kraft process or a black liquor. For example, lignin material not obtained directly or indirectly from a kraft process or black liquor can include, but is not limited to, lignosulfonates, organosolv lignin, soda lignin, or any mixture thereof. In one or more embodiments, the lignin material can include or exclude cations and/or anions that would otherwise be present in naturally occurring lignin. Illustrative cations that are present in naturally occurring lignin can include, but are not limited to, sodium, potassium, calcium, or any combination thereof. Illustrative anions that are present in naturally occurring lignin can include, but are not limited to, carboxylate, sulfonate, sulfate, or any combination thereof. In one or more embodiments, the lignin material can have an ash content that differs from the ash content of a naturally occurring kraft lignin. For example, the lignin material can have an ash content that is lower than the ash content of a naturally occurring kraft lignin. In another example, the lignin material can have an ash content that is greater than the ash content of a naturally occurring kraft lignin.

Native or naturally occurring lignin is a high molecular weight phenylpropane polymer that is present in an amount of about 24 wt % to about 35 wt % in softwood and in an amount of about 17 wt % to about 25 wt % in hardwood. Native lignin is not soluble in water and functions to bond the cellulose fibers of wood together. In commercial kraft pulping processes, wood chips are soaked in an aqueous solution of sodium sulfide and sodium hydroxide at elevated temperatures for a period of time to enable the degradation of the native lignin into a water soluble lignin. The resulting aqueous solution of water soluble lignin is called "black liquor" and can be separated from remaining insoluble cellulose fibers. Black liquor has a pH value of about 13 to about 14. The water soluble lignin can be precipitated out of the black liquor by the addition of an acid such as sulfuric acid, nitric acid, and/or hydrochloric acid. In some commercial processes, the black liquor is first carbonated with carbon dioxide and then precipitated by the addition of sulfuric acid. The resulting precipitate is typically isolated by filtration, washed with additional aliquots of sulfuric acid, washed with water, and then allowed to dry. These treatment steps produce a lignin filter cake that can have a moisture content from a low of about 1 wt %, about 25 wt %, or about 45 wt % to a high of about 50 wt %, about 70 wt %, or about 75 wt %. For example, the lignin filter cake can have a moisture content of about 1 wt % to about 75 wt %, about 25 wt % to about 45 wt %, or about 50 wt % to about 70 wt %. The lignin filter cake can be dried to remove at least a portion of the water.

In one or more embodiments, the lignin material can be or include kraft lignin, alkali lignin, or a mixture thereof. Kraft lignin and alkali lignin are known materials of commerce. The CAS numbers for kraft lignin and alkali lignin are 8068-05-1 and 37203-80-8, respectively. The kraft lignin, alkali lignin, or a mixture of the kraft lignin and the alkali lignin can include less than 20 wt %, less than 15 wt %, less than 10 wt %, less than 7 wt %, less than 6 wt %, less than 5 wt %, less than 4 wt %, less than 3 wt %, less than 2 wt %, or less than 1 wt % of water, based on the total weight of the kraft lignin and/or the alkali lignin.

Depending on the particular lignin material, the amount of ash contained in the lignin material can widely vary. For example, the lignin material can include about 1 wt %, about 1.5 wt %, about 2 wt %, about 2.5 wt %, or about 3 wt % to about 4 wt %, about 5 wt %, about 6 wt %, about 7 wt %, about 8 wt %, about 9 wt %, about 10 wt %, or more of ash. In one or more embodiments, the lignin material can be or include kraft lignin and the kraft lignin can include less than 3 wt %, less than 2.7 wt %, less than 2.5 wt %, less than 2.3 wt %, less than 2 wt %, less than 1.7 wt %, less than 1.5 wt %, less than 1.3 wt %, less than 1 wt %, less than 0.9 wt %, less than 0.8 wt %, less than 0.7 wt % less than 0.6 wt %, less than 0.5 wt %, less than 0.4 wt %, less than 0.3 wt %, less than 0.2 wt %, less than 0.1 wt %, less than 0.07 wt %, less than 0.05 wt %, or less than 0.02 wt % of ash, based on a dry weight of the kraft lignin. The ash content of the lignin material can be measured according to ASTM D2584-11: Standard Test Method for Ignition Loss of Cured Reinforced Resins.

Depending on the particular lignin material, the amount of sulfur contained in the lignin material can widely vary. For example, the lignin material can include about 1 wt %, about 1.5 wt %, about 2 wt %, about 2.5 wt %, or about 3 wt % to about 4 wt %, about 5 wt %, about 6 wt %, about 7 wt %, about 8 wt %, about 9 wt %, about 10 wt %, or more of sulfur. In one or more embodiments, the lignin material can be or include kraft lignin and the kraft lignin can contain less than 5 wt % of sulfur, less than 4.5 wt % of sulfur, less than 4 wt % of sulfur, less than 3.5 wt % of sulfur, less than 3 wt % of sulfur, less than 2.7 wt % of sulfur, less than 2.5 wt % of sulfur, less than 2.3 wt % of sulfur, less than 2 wt % of sulfur, less than 1.7 wt % of sulfur, or less than 1.5 wt % of sulfur. The sulfur content of the lignin material can be measured or calculated using elemental analysis techniques. For example, the sulfur content of the lignin material can be indirectly determined or estimated using CHN analysis, which can be accomplished by combustion analysis. More particularly, a sample of the lignin material can be burned in an excess of oxygen, and various traps can collect the combustion products, such as carbon dioxide, water, and nitric oxide. The masses of these combustion products can be used to calculate the composition of the unknown sample.

In one or more embodiments, a ratio of aromatic carbon atoms plus alkenic carbon atoms to aliphatic carbon atoms (aromatic carbon atoms+alkenic carbon atoms:aliphatic carbon atoms) in the lignin material can be about 1:1, about 1.3:1, about 1.5:1, about 1.7:1, about 2:1, about 2.3:1, about 2.5:1, or about 2.7:1 to about 3.5:1, about 3.7:1, about 4:1, about 4.3:1, about 4.5:1, about 4.7:1, about 5:1, about 5.3:1, about 5.5:1, about 5.7:1, or about 6:1, based on quantitative analysis of $^{13}$C NMR spectra of the lignin material. In one example, the lignin material can have a ratio of aromatic carbon atoms plus alkenic carbon atoms to aliphatic carbon atoms of at least 2.5:1, at least 2.7:1, at least 3:1, at least 3.3:1, at least 3.5:1, at least 3.7:1, at least 4:1, at least 4.3:1, at least 4.5:1, at least 4.7:1, or at least 5:1 to about 5.3:1, about 5.5:1, about 5.7:1, or about 6:1, based on quantitative analysis of $^{13}$C NMR spectra of the lignin material. In another example, the lignin material can have a ratio of aromatic carbon atoms plus alkenic carbon atoms to aliphatic carbon atoms of about 1:1 to about 2:1, about 1.1:1 to about 1.9:1, about 1.2:1 to about 1.8:1, about 1.3:1 to about 1.7:1, about 1.4:1 to about 1.6:1, based on quantitative analysis of $^{13}$C NMR spectra of the lignin material. In one or more embodiments, lignin material can be or include kraft lignin and the kraft lignin can have a ratio of aromatic carbon atoms plus alkenic carbon atoms to aliphatic carbon atoms of at least 2.5:1, at least 2.7:1, at least 3:1, at least 3.3:1, at least 3.5:1, at least 3.7:1, at least 4:1, at least 4.3:1, at least 4.5:1, at least 4.7:1, or at least 5:1 to about 5.3:1, about 5.5:1, about 5.7:1, or about 6:1, based on quantitative analysis of $^{13}$C NMR spectra of the kraft lignin.

In one or more embodiments, the lignin material can be a solid, e.g., a solid powder. In one or more embodiments, the lignin material can be in the form of a liquid solution, mixture, or dispersion. In one or more embodiments, the lignin material can be in the form of a semi-solid. Lignin material in the form of a semi-solid means that the lignin material includes greater than about 1 wt % or greater than about 1 vol % of solid, undissolved lignin material within a liquid solution. For example, semi-solid lignin material can include about 1% to about 20%, about 1% to about 10%, about 1% to about 5%, or about 1% to about 3% of solid material by weight of the liquid solution or by volume of the liquid solution.

In one or more embodiments, the lignin material can have a water or moisture content of less than 50 wt %, less than 45 wt %, less than 40 wt %, less than 37 wt %, less than 35 wt %, less than 33 wt %, less than 30 wt %, less than 27 wt %, less than 35 wt %, less than 23 wt %, less than 20 wt %, less than 17 wt %, less than 15 wt %, less than 13 wt %, less than 10 wt %, less than 9 wt %, less than 8 wt %, less than 7 wt %, less than 6 wt %, less than 5 wt %, less than 4 wt %, less than 3 wt %, less than 2 wt %, less than 1 wt %, or less than 0.5 wt %. For example, the lignin material can have a water or moisture content of about 0.5 wt % to about 5.5 wt %, about 1 wt % to about 4.5 wt %, about 1.5 wt % to about 3 wt %, about 2 wt % to about 4 wt %, about 1.7 wt % to about 3.3 wt %, about 1 wt % to about 2.5 wt %, about 0.7 wt % to about 3.5 wt %, about 3 wt % to about 6 wt %, about 4 wt % to about 8 wt %, about 5 wt % to about 7 wt %, about 6 wt % to about 9 wt %, or about 1 wt % to about 9.5 wt %. In another example, the lignin material can include about 2 wt %, about 5 wt %, about 7 wt %, about 10 wt %, 15 wt %, about 20 wt %, or about 25 wt % to about 30 wt %, about 35 wt %, about 40 wt %, or about 45 wt % of a liquid, e.g., water, and about 55 w% to about 98 wt % of solid material by weight of the lignin material.

The lignin material can have an average particle size from a low of about 1 μm, about 5 μm, about 10 μm, about 15 μm, about 20 μm, or about 25 μm to a high of about 30 μm, about 40 μm, about 50 μm, about 60 μm, about 70 μm, about 80 μm, about 90 μm, or about 100 μm. For example, the lignin material can have an average particle size of about 1 μm to about 80 μm, about 2 μm to about 40 μm, about 3 μm to about 30 μm, about 1 μm to about 15 μm, about 10 μm to about 25 μm, about 20 μm to about 40 μm, about 35 μm to about 65 μm, about 45 μm to about 75 μm, or about 55 μm to about 75 μm, or about 60 μm to about 95 μm. In another example, the lignin material can have an average particle size of less than 75 μm, less than 65 μm, less than 55 μm, less than 45 μm, less than 40 μm, less than 35 μm, less than 30 μm, less than 25 μm, less than 20 μm, or less than 15 μm.

The lignin material can have a maximum particle size of 200 μm, 180 μm, 160 μm, 140 μm, 120 μm, 100 μm, 90 μm, 80 μm, 70 μm, 60 μm, 50 μm, or 40 μm. The lignin material can have a maximum particle size of less than 200 μm, less than 180 μm, less than 160 μm, less than 140 μm, less than 120 μm, less than 100 μm, less than 90 μm, less than 80 μm, less than 70 μm, less than 60 μm, less than 50 μm, or less than 40 μm and greater than about 1 μm, about 2 μm, about 3 μm, about 5 μm, or about 10 μm.

In one or more embodiments, the lignin material can have an average particle size from a low of about 1 μm, about 5 μm, about 10 μm, about 15 μm, about 20 μm, or about 25 μm to a high of about 30 μm, about 40 μm, about 50 μm, about 60 μm, about 70 μm, about 80 μm, about 90 μm, or about 100 μm and a maximum particle size of 200 μm, 180 μm, 160 μm, 140 μm, 120 μm, 100 μm, 90 μm, 80 μm, 70 μm, 60 μm, 50 μm, or 40 μm. For example, the lignin material can have an average particle size of about 1 μm to about 80 μm and a maximum particle size of 200 μm. In another example, the lignin material can have an average particle size of about 2 μm to about 40 μm and a maximum particle size of 100 μm. In another example, the lignin material can have an average particle size of about 3 μm to about 30 μm and a maximum particle size of 80 μm.

The average particle size and the maximum particle size of the lignin material and the phenol-aldehyde resin can be measured with a Cilas 990D Particle Size Analyzer configured with Particle Expert software. A vacuum cleaner equipped with a HEPA filter or equivalent capable of capturing the sample to be measured can be used. It should be ensured that the feeder mechanism, venturi block, and lenses are completely clean. Calibration should be unnecessary unless the detector or laser has been repaired or replaced. If calibration is required, the procedure can use Whitehouse Certified Glass Beads or other material meeting the requirements of ISO 13320-1. The following steps can be followed to measure the average and maximum particle sizes. First, in the Particle Expert software, the analysis button can be clicked on and the sample information can be entered. Second, the "background" can be clicked on and the system can be allowed to perform an ambient measurement. This step is unnecessary for subsequent measurements, as a background measurement will automatically be taken for every sample. Third, it should be ensured that the feeder bowl and control ring are firmly tightened to the instrument and that the slide is centered over the feed funnel. Fourth, after the background measurement has been completed, a pipet or scoop can be used to transfer about 2 grams of material to the feed bowl. It should be ensured that the sample is evenly mixed and has not settled. Fifth, the settings for the feed vibrator can be selected such that during operation, the obscuration should remain between 5% and 20%. Sixth, "run sample" can be clicked. Once the analysis has completed, the feed control ring and feeder bowl can be removed. Any remaining material can be disposed of The feeder bowl can be wiped clean with a dry cloth. Seventh, after the analysis has completed, the results window will appear. Specific size results will be available on the data tab. To obtain the fraction of total product within a particular diameter range, the cumulative value at the bottom of the range can be subtracted from the cumulative value at the top of the range.

As used herein, the term "phenol-aldehyde resin" refers to a synthetic polymer obtained from the reaction of one or more phenolic compounds with one or more aldehyde compounds. Any known method capable of producing a phenol-aldehyde resin can be used. Suitable methods for synthesizing a phenol-aldehyde resin can include both single step processes and multi-step or "programmed" processes (i.e., staged monomer/catalyst addition). While batch operations are the standard, continuous processes can also be used. Standard conditions, procedures and reactants for making phenol-aldehyde resins, e.g., phenol-formaldehyde resins, well-known to those skilled in the art.

In one or more embodiments, a weight ratio or a volume ratio of the aldehyde compound to the phenolic compound in the phenol-aldehyde resin can be about 2:1 to about 1:2, about 3:1 to about 1:3, about 4:1 to about 1:4, about 5:1 to about 1:5, about 6:1 to about 1:6, about 7:1 to about 1:7, about 8:1 to about 1:8, about 1:9 to about 9:1, or about 1:10 to about 10:1. In one or more embodiments, a molar ratio of the aldehyde compound to the phenolic compound in the phenol-aldehyde resin can be about 1.5:1 to about 3:1, about 1.9:1 to about 2.6:1, about 2:1 to about 2.5:1, about 2.1:1 to about 2.6:1, about 2.2:1 to about 2.5:1, or about 2.3:1 to about 2.5:1.

In one or more embodiments, the phenol-aldehyde resin, when mixed with water, can form an aqueous solution, dispersion, suspension, or other mixture that can have a pH from about 7, about 8, about 9, or about 10 to about 11, about 12, or about 13. For example, the phenol-aldehyde resin, when mixed with water, can form an aqueous solution, dispersion, suspension, or other mixture that can have a pH of about 10.5 to about 12.5, about 8 to about 11, about 9 to about 10.5, about 9.5 to about 11.5, about 10 to about 12, about 10.5 to about 11, about 10.6 to about 12, about 11 to about 12, or about 11.5 to about 12.5.

The aldehyde compound can be or include one or more substituted aldehyde compounds, one or more unsubstituted aldehyde compounds, or any mixture of substituted and/or unsubstituted aldehyde compounds. Illustrative aldehyde compounds can include, but are not limited to, aldehydes having the chemical formula RCHO, where R is hydrogen or a hydrocarbyl group. Illustrative hydrocarbyl groups can include 1 carbon atom to about 8 carbon atoms. Suitable aldehyde compounds can also include the so-called masked aldehydes or aldehyde equivalents, such as acetals or hemi-acetals. Illustrative aldehyde compounds can include, but are not limited to, formaldehyde, paraformaldehyde, cinnamaldehyde, tolualdehyde, acetaldehyde, propionaldehyde, butyraldehyde, furfural, benzaldehyde, retinaldehyde, glyoxal, malondialdehyde, succindialdehyde, glutaraldehyde, phthaldehyde, derivatives thereof, or any mixture thereof. Still other suitable formaldehyde compounds can include formaldehyde present in a prepolymer or pre-condensate such as urea-formaldehyde precondensate (UFC). In at least one embodiment, the aldehyde compound can be or include formaldehyde.

The phenolic compound can be or include any one or more of a number of phenolic compounds. The one or more phenolic compounds can be or include phenol, one or more substituted phenol compounds, one or more unsubstituted phenol compounds, or any combination or mixture of substituted and/or unsubstituted phenol compounds. For example, the phenolic component can be or include phenol itself (monohydroxybenzene). Illustrative substituted phenolic compounds can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; halogen-substituted phenols such as p-chlorophenol, or any mixture thereof. Dihydric phenols such as catechol, resorcinol, hydroquinone, bisphenol A and bisphenol F also can also be used. For example, the phenolic compound can be or include, but is not limited to, resorcinol, phenol, catechol, hydroquinone, pyrogallol, 5-methylresorcinol, 5-ethylresorcinol, 5-propylresorcinol, 4-methylresorcinol, 4-ethylresorcinol, 4-propylresorcinol, resorcinol monobenzoate, resorcinol monosinate, resorcinol diphenyl ether, resorcinol monomethyl ether, resorcinol monoacetate, resorcinol dimethyl ether, phloroglucinol, benzoylresorcinol, resorcinol rosinate, alkyl substituted resorcinol, aralkyl substituted resorcinol, 2-methylresorcinol, phloroglucinol, 1,2,4-benzenetriol, 3,5-dihydroxybenzaldehyde, 2,4-dihydroxybenzaldehyde, 4-ethylresorcinol, 2,5-dimethylresorcinol, 5-methylbenzene-1,2,3-triol, 3,5-dihydroxybenzyl alcohol, 2,4,6-trihydroxytoluene, 4-chlororesorcinol, 2',6'-dihydroxyacetophenone, 2',4'-dihydroxyacetophenone, 3',5'-dihydroxyacetophenone, 2,4,5-trihydroxybenzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 1,3-dihydroxynaphthalene, 2',4'-dihydroxypropiophenone, 2',4'-dihydroxy-6'-methylacetophenone, 1-(2,6-dihydroxy-3-methylphenyl)ethanone, 3-methyl 3,5-dihydroxybenzoate, methyl 2,4-dihydroxybenzoate, gallacetophenone, 2,4-dihydroxy-3-methylbenzoic acid, 2,6-dihydroxy-4-methylbenzoic acid, methyl 2,6-dihydroxybenzoate, 2-methyl-4-nitroresorcinol, 2,4,5-trihydroxybenzoic acid, 3,4,5-trihydroxybenzoic acid, 2,3,4-trihydroxybenzoic acid, 2,4,6-trihydroxybenzoic acid, 2-nitrophloroglucinol, or any mixture thereof. In at least one embodiment, the phenolic compound can be or include phenol. The phenolic compound can include any combination or mixture of two or more phenolic compounds combined with one another and/or added independent of one another to the reaction mixture.

In one or more embodiments, the phenol-aldehyde resin can also include one or more other aldehyde-based resins. Illustrative aldehyde-based resins can include, but are not limited to, one or more urea-aldehyde resins, one or more melamine-aldehyde resins, one or more phenol-aldehyde resins, e.g., phenol-formaldehyde novolac resin and/or phenol-formaldehyde resole resins, one or more dihydroxybenzene or "resorcinol"-aldehyde resins, one or more phenol-resorcinol-aldehyde resins, one or more melamine-urea-aldehyde resins, one or more phenol-urea-aldehyde resins, or any mixture thereof. In some embodiments, the aldehyde-based resin can be or include a phenol-formaldehyde resin. The phenol-formaldehyde resin can also be or include a phenol-formaldehyde resole resin. In still other embodiments, the aldehyde-based resin does not include urea. In yet other embodiments, the aldehyde-based resin does not include melamine. In another embodiment, the aldehyde-based resin does not include urea or melamine.

The phenol-aldehyde resin can have a water or moisture content of less than 20 wt, less than 15 wt %, less than 10 wt %, less than 7 wt %, less than 6 wt %, less than 5 wt %, less than 4 wt %, less than 3 wt %, less than 2 wt %, less than 1 wt %, or less than 0.5 wt %. For example, the phenol-aldehyde resin can have a water or moisture content of about 0.5 wt % to about 3 wt %, about 1 wt % to about 2 wt %, about 0.5 wt % to about 1.5 wt %, about 1.5 wt % to about 3.5 wt %, about 1 wt % to about 2.5 wt %, about 0.7 wt % to about 3.5 wt %, about 3 wt % to about 6 wt %, about 4 wt % to about 8 wt %, about 5 wt % to about 7 wt %, about 6 wt % to about 9 wt %, or about 1 wt % to about 9.5 wt %.

The phenol-aldehyde resin can have an average particle size from a low of about 10 µm, about 20 µm, about 30 µm, about 40 µm, about 50 µm, or about 60 µm to a high of about 80 µm, about 100, µm, about 130 µm, about 150 µm, about 170 µm, about 200 µm, or about 220 µm. For example, the phenol-aldehyde resin can have an average particle size of about 20 µm to about 200 µm, about 30 µm to about 100 µm, about 40 µm to about 80 µm, about 25 µm to about 65 µm, about 45 µm to about 90 µm about 65 µm to about 110 µm, about 105 µm to about 140 µm, about 125 µm to about 165 µm, about 145 µm to about 185 µm, or about 165 µm to about 205 µm. In another example, the phenol-aldehyde resin can have an average particle size of less than 200 µm, less than 160 µm, less than 140 µm, less than 120 µm, less than 100 µm, less than 90 µm, less than 80 µm, less than 70 µm, or less than 60 µm.

The phenol-aldehyde resin can have a maximum particle size of 500 µm, 450 µm, 400 µm, 350 µm, 300 µm, 275 µm, 250 µm, 225 µm, 200 µm, 175 µm, 150 µm, 125 µm, or 100 µm. The phenol-aldehyde resin can have a maximum particle size of less than 500 µm, less than 450 µm, less than 400 µm, less than 350 µm, less than 300 µm, less than 275 µm, less than 250 µm, less than 225 µm, less than 200 µm, less than 175 µm, less than 150 µm, less than 125 µm, or less than 100 µm.

In one or more embodiments, the phenol-aldehyde resin can have an average particle size from a low of about 10 µm, about 20 µm, about 30 µm, about 40 µm, about 50 µm, or about 60 µm to a high of about 80 µm, about 100, µm, about 130 µm, about 150 µm, about 170 µm, about 200 µm, or about 220 µm and a maximum particle size of 500 µm, 450 µm, 400 µm, 350 µm, 300 µm, 275 µm, 250 µm, 225 µm, 200 µm, 175 µm, 150 µm, 125 µm, or 100 µm. For example, the phenol-aldehyde resin can have an average particle size of about 20 µm to about 200 µm and a maximum particle size of 500 µm. In another example, the phenol-aldehyde resin can have an average particle size of about 30 µm to about 100 µm and a maximum particle size of 300 µm. In another example, the phenol-aldehyde resin can have an average particle size of about 40 µm to about 80 µm and a maximum particle size of 200 µm.

In one or more embodiments, the mixture can include lignin material that can have an average particle size from a low of about 1 µm, about 5 µm, about 10 µm, about 15 µm, about 20 µm, or about 25 µm to a high of about 30 µm, about 40 µm, about 50 µm, about 60 µm, about 70 µm, about 80 µm, about 90 µm, or about 100 µm and a maximum particle size of 200 µm, 180 µm, 160 µm, 140 µm, 120 µm, 100 µm, 90 µm, 80 µm, 70 µm, 60 µm, 50 µm, or 40 µm and phenol-aldehyde resin that can have an average particle size from a low of about 10 µm, about 20 µm, about 30 µm, about 40 µm, about 50 µm, or about 60 µm to a high of about 80 µm, about 100, µm, about 130 µm, about 150 µm, about 170 µm, about 200 µm, or about 220 µm and a maximum particle size of 500 µm, 450 µm, 400 µm, 350 µm, 300 µm, 275 µm, 250 µm, 225 µm, 200 µm, 175 µm, 150 µm, 125 µm, or 100 µm. In one or more embodiments, the mixture can include lignin material that can have an average particle size of less than 75 µm, less than 65 µm, less than 55 µm, less than 45 µm, less than 40 µm, less than 35 µm, less than 30 µm, less than 25 µm, less than 20 µm, or less than 15 µm and a maximum particle size of 200 µm, 180 µm, 160 µm, 140 µm, 120 µm, 100 µm, 90 µm, 80 µm, 70 µm, 60 µm, 50 µm, or 40 µm and phenol-aldehyde resin that can have an average particle size of less than 200 µm, less than 160 µm, less than 140 µm, less than 120 µm, less than 100 µm, less than 90 µm, less than 80 µm, less than 70 µm, or less than 60 µm and a maximum particle size of 500 µm, 450 µm, 400 µm, 350 µm, 300 µm, 275 µm, 250 µm, 225 µm, 200 µm, 175 µm, 150 µm, 125 µm, or 100 µm.

In at least one embodiment, the mixture can include kraft lignin and the phenol-aldehyde resin and can have a moisture content of less than 10 wt %, based on the total weight of the mixture. The kraft lignin can include less than 3 wt %, less than 2.5 wt %, less than 2 wt %, less than 1.7 wt %, less than 1.5 wt %, less than 1.3 wt %, or less than 1 wt % of ash and less than 5 wt %, less than 4 wt %, less than 3 wt %, less than 2 wt %, or less than 1.5 wt % of sulfur. The kraft lignin can have an average particle size from a low of about 1 µm, about 5 µm, about 10 µm, about 15 µm, about 20 µm, or about 25 µm to a high of about 30 µm, about 40 µm, about 50 µm, about 60 µm, about 70 µm, about 80 µm, about 90 µm, or about 100 µm. The kraft lignin can have a maximum particle size of 200 µm, 180 µm, 160 µm, 140 µm, 120 µm, 100 µm, 90 µm, 80 µm, 70 µm, 60 µm, 50 µm, or 40 µm. The phenol-aldehyde resin can have an average particle size from a low of about 10 µm, about 20 µm, about 30 µm, about 40 µm, about 50 µm, or about 60 µm to a high of about 80 µm, about 100 µm, about 130 µm, about 150 µm, about 170 µm, about 200 µm, or about 220 µm. The phenol-aldehyde resin can have a maximum particle size of 500 µm, 450 µm, 400 µm, 350 µm, 300 µm, 275 µm, 250 µm, 225 µm, 200 µm, 175 µm, 150 µm, 125 µm, or 100 µm.

In one or more embodiments, the mixture that includes the one or more lignin materials and the one or more phenol-aldehyde resins can further include one or more fillers. As used herein, the term "filler" refers to materials that can be added to the mixture that occupy volume but do not contribute or do not substantially contribute to bonding properties of the mixture. Suitable fillers include, but are not limited to, one or more nut shells, one or more seed shells, one or more fruit pits, one or more animal bones, milwhite, one or more clays, one or more glasses, one or more inorganic oxides such as silica and/or alumina, or any mixture thereof. The filler can be ground, crushed, pulverized, other otherwise reduced into particulate form.

Illustrative nut shells include, but are not limited to, walnut shells, pecan shells, almond shells, ivory nut shells, brazil nut shells, ground nut (peanut) shells, pine nut shells, cashew nut shells, sunflower seed shells, Filbert nut (hazel nut) shells, macadamia nut shells, soy nut shells, pistachio nut shells, pumpkin seed shells, or the like, or any mixture thereof. Illustrative seed shells (including fruit pits), can include, but are not limited to, the seed shells of fruit, e.g., plum, peach, cherry, apricot, olive, mango, jackfruit, guava, custard apples, pomegranates, and watermelon, ground or crushed seed shells of other plants such as maize (e.g., corn cobs or corn kernels), wheat, rice, jowar, or the like, or any mixture thereof. Other examples of suitable fillers include, but are not limited to, wheat shell, corn husk, peanut shell, or any combination thereof. In an embodiment, the nut shells and/or seed shells may be ground or powdered, e.g., in a flour form. In embodiments, suitable flours derived from nut shells may include, but are not limited to, walnut shell flour, pecan shell flour, almond shell flour, or any mixture thereof. In other embodiments, flour derived from the seed shells of fruits may include, but are not limited to, apricot pit shell flour, peach pit shell flour, prune pit shell flour, or any mixture thereof.

In one or more embodiments, mixture that includes the one or more lignin materials and the one or more phenol-aldehyde resins can further include one or more extenders. As used herein, the term "extender" refers to materials that can be added to the mixture that occupy volume and also contribute to bonding properties of the mixture. One example of a suitable extender can be a material that includes one or more proteins. The protein can contribute to the crosslinking of the mixture during at least partial cure thereof. Suitable extenders can include, but are not limited to, corn flour, soy flour, wheat flour, spray dried blood, or any mixture thereof.

Illustrative soy flour can be or include a raw soy protein and/or a soy protein modified as discussed and described in U.S. Pat. No. 6,497,760. Raw soy protein maybe in the form of ground whole beans (including the hulls, oil, protein, minerals, etc.), a meal (extracted or partially extracted), a flour (generally containing less than about 1.5% oil and about 30-35% carbo-hydrate), or an isolate (a substantially pure protein flour containing less than about 0.5% oil and less than about 5% carbohydrate). Suitable soy protein can be derived from any source of soy protein such as soybean concentrate or soybean meal. Protein-rich soybean-derived flours, such as soy protein isolate, protein concentrate, and ordinary defatted soy flour, which contain in the range of about 20-95% protein, may also be used. The source of soy protein (soy flour) may be substantially free of functional urease. Information on soy protein can be found in, for example, Kirk-Othmer, Encyclopedia of Chemical Technology, Fourth Edition, Volume 22, pp. 591-619 (1997). Modified soy protein may be modified with either of two classes of modifiers. The first class of modifiers may include saturated and unsaturated alkali metal C8-C22 sulfate and sulfonate salts. In some embodiments, modifiers in this class may be sodium dodecyl sulfate and sodium dodecylbenzene sulfonate. The second class of modifiers includes compounds having the formula $R_2NC(=X)NR_2$, where each R group may be individually selected from the group consisting of —H and $C_1$-$C_4$ saturated and unsaturated groups, and —X may be selected from the group consisting of O, NH, and S. The $C_1$-$C_4$ saturated groups refer to alkyl groups (both straight and branched chain) and the unsaturated groups refer to alkenyl and alkynyl groups (both straight and branched chain). In some embodiments, modifiers in the second group include, but are not limited to, urea and guanidine hydrochloride. Other suitable extenders can include, but are not limited to, those discussed and described in U.S. Pat. Nos. 2,507,465; 2,492,510; 2,781,286; 3,285,805; 3,957,703; 4,070,314; 4,244,846; and 4,778,530.

The fillers and/or extenders can have an average particle size from a low of about 0.1 µm to a high of about 100 µm. For example, the average particle size of the fillers and/or extenders can be from about 1 µm, about 3 µm, about 5 µm, about 8 µm, or about 10 µm to about 30 µm, about 40 µm, about 50 µm, or about 60 µm. In another example, the average particle size of the fillers and/or extenders can be from about 7 µm to about 30 µm, about 10 µm to about 30 µm, about 20 µm to about 35 µm, about 0.1 µm to about 10 µm, about 5 µm to about 45 µm, about 15 µm to about 35 µm, or about 10 µm to about 50 µm. The average particle size of the filler and/or extender, if present, can be measured in the same manner discussed and described above with regard to the lignin material and the phenol-aldehyde resin.

In one or more embodiments, the mixture can include both the one or more fillers and the one or more extenders. If the mixture includes both the filler and the extender, the amount of the filler in the mixture can be from about 0.1 wt % to about 99.9 wt %, based on the combined weight of the filler and the extender. In another example, if the mixture includes both the filler and the extender, the amount of the filler can be from a low of about 0.5 wt %, about 1 wt %, about 5 wt %, about 10 wt %, or about 20 wt % to a high of about 30 wt %, about 40 wt %, about 50 wt %, about 60 wt %, about 70 wt %, about 80 wt %, about 90 wt %, or about 95 wt %, based on the combined weight of the filler and the extender.

In one or more embodiments, the mixture can be formed by mixing, blending, or otherwise combining one or more aldehydes or aldehyde compounds, one or more phenols or phenolic compounds, and one or more lignin materials and reacting the aldehyde compound and the phenolic compound to produce a phenol-aldehyde resin. In some embodiments, there is substantially no reaction between the aldehyde compound and the lignin material within the mixture. In some embodiments, there is substantially no reaction between the phenolic compound and the lignin material within the mixture. In some embodiments, there is substantially no reaction between the aldehyde compound and the lignin material and there is substantially no reaction between the phenolic compound and the lignin material in the mixture. In other embodiments, there is substantially no reaction between the formed phenol-aldehyde resin and the lignin material within the mixture. In some embodiments, the one or more lignin materials can be combined with a liquid phenol-aldehyde resin, e.g., an aqueous phenol-formaldehyde resin.

As used herein, the term "substantially no reaction" means that the components are combined to become a chemical mixture. In some embodiments, "substantially no reaction" means that less than about 5%, less than about 3%, or less than about 1%, by weight or by volume, of the aldehyde and the lignin material react with each other to form a reaction product. In some embodiments, less than about 5%, less than about 3%, or less than about 1%, by weight or by volume, of the phenol and the lignin material react to form a reaction product. In still other embodiments, less than about 5%, less than about 3%, or less than about 1%, by weight or by volume, of the phenol-aldehyde resin and the lignin material react to form a reaction product. In still other embodiments, kraft lignin can be mixed with the phenol-aldehyde resin and no reaction occurs between the kraft lignin and the phenol-aldehyde resin.

If the lignin material is combined with a liquid phenol-aldehyde resin, the lignin and liquid phenol-aldehyde resin can be dried, e.g., spray dried, to produce a mixture that contains liquid, e.g., water, in an amount of less than 10 wt %, based on the total weight of the dried mixture. Any method or combination of methods capable of removing liquid, e.g., water, from the phenol-aldehyde resin and/or the lignin material can be used. Illustrative processes that can be used to remove liquid, e.g., water, from the phenol-aldehyde resin, the lignin material, and/or a mixture of the phenol-aldehyde resin and the lignin material can include, but are not limited to, spray-drying, freeze drying, drum drying, pulse combustion drying, vacuum drying, precipitation, air drying, and/or dry spinning Spray drying refers to the process of producing a particulate solid product from the liquid mixture. The process can include spraying or atomizing the liquid mixture, e.g., forming small droplets, into a temperature controlled gas stream to evaporate the liquid from the atomized droplets and produce the dry particulate solid. The temperature of the liquid mixture during the spray-drying process can usually be close to or greater than the boiling temperature of the liquid. An outlet air temperature of about 60° C. to about 120° C. can be common. A dry particulate solid can contain less than 20 wt %, less than 15 wt %, less than 10 wt %, less than 5 wt %, less than 4 wt %, less than 3 wt %, or less than 2 wt % of water. The phenol-aldehyde resin or a mixture of a liquid phenol-aldehyde resin and the lignin material can be spray dried to produce a particulate solid product.

In one or more embodiments, the mixture that includes the lignin material and the phenol-aldehyde resin and has a moisture concentration of less than 10 wt % can bond lignocellulose substrates in a substantially similar way as compared to a traditional phenol-aldehyde resin that does not include the lignin material. As such, the mixture that includes the lignin material and the phenol-aldehyde resin and has a moisture concentration of less than 10 wt % can also be referred to as an adhesive, an adhesive mixture, a binder, a binder mixture, or the like. It should also be noted that the mixture that includes the lignin material and the phenol-aldehyde resin and has a moisture concentration of less than 10 wt % can also be referred to as a lignin blend. In some embodiments, an engineered wood product prepared using the mixture can have at least one physical property that is substantially similar to the physical property of a comparable engineered wood product prepared using a phenol-aldehyde resin composition that does not include the lignin material. As used herein, the term "substantially similar" with regard to the bonding of wood means that the mixture, when used to prepare engineered wood, results in an engineered wood product that has quantifiable properties that are at least 90%, at least 95%, at least 98%, or at least 99% of the quantifiable property observed for a comparable engineered wood material prepared with the same mixture except the lignin material is absent from the mixture. Quantifiable properties of engineered wood products include, but are not limited to, those discussed and described in the ASTM D1037-12 standardized test, i.e., internal bond, boiled internal bond, water soak, thickness swelling, water absorption, D-4 testing, bending testing, and cycle testing.

In one or more embodiments, a lignocellulosic or wood-based composite product or structure can be made by combining a plurality of lignocellulosic substrates and the mixture that includes the lignin material and the phenol-aldehyde resin and at least partially curing the phenol-aldehyde resin. The mixture can be a powder. The mixture can include less than 10 wt % water based on a total weight of the mixture. The mixture can be mixed, blended, sprayed, or otherwise contacted with the lignocellulosic substrate(s) to produce a resinated furnish. The phenol-aldehyde resin can be at least partially cured, e.g., by heating the resinated furnish, to produce the composite product or structure.

As used herein, the terms "curing," "cured," "at least partially curing," "at least partially cured," and similar terms are intended to refer to the structural and/or morphological change that occurs in the mixture, such as by covalent chemical reaction (crosslinking), ionic interaction or clustering, phase transformation or inversion, and/or hydrogen bonding when the is subjected to conditions sufficient, e.g., sufficiently heated, to cause the properties of a flexible, porous substrate, such as a nonwoven mat or blanket of lignocellulose substrates and/or a rigid or semi-rigid substrate, such as a wood or other lignocellulose containing board or sheet, to which an effective amount of the mixture has been applied, to be altered.

Illustrative lignocellulose or wood-based composite products or structures can include, but are not limited to, oriented strand boards (OSB), particleboards, structural timber, hard board, medium density board, engineered lumber, glued laminated timber, plywood, fiberboards, pressed wood, wood-based panels, veneers, and the like. In one example, an oriented strand board can be made by combining the mixture with a plurality of wooden strands to produce a resinated furnish. In another example, a particleboard can be made by combining the mixture and the wood chips, sawmill shavings, or saw dust to produce a resinated furnish. In another example, a plywood can be made by contacting a plurality of sheets or veneers of wood the mixture to produce a structure having the mixture disposed between at least two sheets of wood. In another example, a fiberboard can be made by combining the mixture and a plurality of wood fibers to produce a resinated fiber. The mixture can include the one or more lignin materials and the one or more phenol-aldehyde resins as discussed and described above. The resinated furnish, resinated fiber, and the structure having the mixture disposed between at least two sheets of wood can be heated to produce the composite product. For example, the temperature the resinated furnish, resinated fiber, and/or the structure having the mixture disposed between at least two sheets of wood can be heated to produce an the composite product can range from a low of about 100° C., about 125° C., about 150° C., or about 170° C. to a high of about 180° C., about 200° C., about 220° C., or about 250° C. The resinated furnish, resinated fiber, and/or the structure having the mixture disposed between at least two sheets of wood can also be pressed when heated to produce the composite product. For example, the amount of pressure applied to the resinated furnish, resinated fiber, and/or the structure having the mixture disposed between at least two sheets of wood can be from a low of about 1 MPa, about 2 MPa, or about 3 MPa to a high of about 4 MPa, about 5 MPa, about 6 MPa, or about 7 MPa. The length of time the heat and/or pressure can be applied can be from a low of about 15 second, about 30 seconds, about 1 minute, about 3 minutes, about 5 minutes, or about 7 minutes to a high of about 10 minutes, about 15 minutes, about 20 minutes, or about 30 minutes, which can depend, at least in part, on the particular product and/or the particular dimensions, e.g., thickness of the product.

In one or more embodiments, the mixture that includes the one or more lignin materials and the one or more phenol-formaldehyde resins can be used as a foundry resin, as a proppant, as a coating for a proppant, as a coating material for other solid structures, in the manufacture of laminates, etc.

EXAMPLES

In order to provide a better understanding of the foregoing discussion, the following non-limiting examples are offered. Although the examples can be directed to specific embodiments, they are not to be viewed as limiting the invention in any specific respect.

Example 1

To a container was added about 1,400 grams of a powdered phenol-formaldehyde resin PF 190080 (supplied by Lufkin) and about 600 grams of a powdered kraft lignin (supplied by Domtar and had CAS No. 8068-05-1). The phenol-formaldehyde resin contained about 4.5wt % of water, a molar ratio of phenol to formaldehyde of about 2-2.6:1, an average particle size of about 60 µm, a maximum particle size of about 200 µm, and a pH of about 10.5 to about 12.5. The powdered kraft lignin contained about 4.6 wt % of water, had an average particle size of about 6 µm, a maximum particle size of about 60 µm, and an ash content of less than 1 wt %.

The powdered phenol-formaldehyde resin and the powdered kraft lignin were mechanically dry-blended using a spatula and then twice filtered through a first screen (595 µm). The mixture was finally sieved twice through a second screen (250 µm) to ensure good mixing of the powdered phenol-formaldehyde resin and the powdered kraft lignin. The mixture of the powdered phenol-formaldehyde resin and the powdered kraft lignin contained about 4 wt % of water.

The mixture had an explosion constant ($K_{st}$) of about 128 bar m/s and a minimum ignition energy (MIE) of about 1,000 mJ to about 10,000 mJ. The explosion constant ($K_{st}$) and minimum ignition energy (MIE) of the mixture were measured according to ASTM E-1226-12A, ASTM E-2019-03(2013) in a 20 L sphere.

Example 2

A mixture of powdered kraft lignin, spray-dried phenol-formaldehyde resin, and corn flour was prepared. To a container was added about 1,600 grams of a powdered phenol-formaldehyde resin (PF 190080), about 300 grams of a powdered kraft lignin, and about 100 grams of a corn flour. The powdered kraft lignin and the spray-dried phenol-formaldehyde resin were the same as those used in Example 1. The corn flour contained about 8.5 wt % of water, had an average particle size of about 35 µm, and had a maximum particle size of about 200 µm.

The mixture was mechanically dry-blended using a spatula and then twice filtered through a first screen (595 µm). The mixture was finally sieved twice through a second screen (250 µm) to ensure good mixing of the blend. The mixture of the powdered phenol-formaldehyde resin, the powdered kraft lignin, and the corn flour contained about 1.5 wt % of water.

The mixture had an explosion constant ($K_{st}$) of 173 bar m/s and a minimum ignition energy (MIE) of about 1,000 mJ to about 10,000 mJ. The explosion constant ($K_{st}$) and minimum ignition energy (MIE) of the mixture were measured according to ASTM E-1226-12A, ASTM E-2019-03 (2013) in a 20 L sphere.

As shown in Examples 1 and 2, it was surprisingly and unexpectedly discovered that mixtures of phenol-formaldehyde and kraft lignin that contained less than 10 wt % moisture had an explosion constant ($K_{st}$) of less than 300 bar m/s and a minimum ignition energy (MIE) of at least 100 mJ.

Embodiments of the present disclosure further relate to any one or more of the following paragraphs:

1. A lignin blend comprising: a phenol-aldehyde resin; and a lignin material, wherein the lignin blend is a powder with a moisture content of less than about 10 wt % of the lignin blend.

2. The lignin blend according to paragraph 1, wherein the lignin blend has an explosion constant ($K_{st}$) of less than about 300 bar m/s.

3. The lignin blend according to paragraph 1 or 2, wherein the lignin blend has an explosion constant ($K_{st}$) of less than about 200 bar m/s.

4. The lignin blend according to any one of paragraphs 1 to 3, wherein the lignin blend has a minimum ignition energy (MIE) of at least about 100 mJ.

5. The lignin blend according to any one of paragraphs 1 to 4, wherein the lignin blend has a minimum ignition energy (MIE) of at least about 500 mJ.

6. The lignin blend according to any one of paragraphs 1 to 5, wherein the lignin blend is an adhesive suitable for bonding a wood composite.

7. The lignin blend according to any one of paragraphs 1 to 6, wherein the lignin material is kraft lignin.

8. The lignin blend according to any one of paragraphs 1 to 7, wherein the lignin material is present in the lignin blend in an amount in the range of about 10 wt % to about 40 wt % of the lignin blend.

9. The lignin blend according to any one of paragraphs 1 to 8, wherein the weight ratio of the lignin material to the phenol-aldehyde resin is in the range of about 5:95 to about 40:60.

10. The lignin blend according to any one of paragraphs 1 to 9, wherein a ratio of the aldehyde to the phenol is in the range of about 1:10 to about 10:1.

11. The lignin blend according to any one of paragraphs 1 to 10, wherein the aldehyde comprises formaldehyde.

12. The lignin blend according to any one of paragraphs 1 to 11, wherein the phenol comprises one or more polyphenols.

13. The lignin blend according to any one of paragraphs 1 to 12, wherein the lignin material has a moisture content of less than about 15% by weight.

14. The lignin blend according to any one of paragraphs 1 to 13, wherein the lignin material is kraft lignin.

15. The lignin according to any one of paragraphs 1 to 14, further comprising at least one filler.

16. The lignin blend according to any one of paragraphs 1 to 15, further comprising at least one extender.

17. A wood-based composite structure comprising: one or more wood-based composite panels; and an adhesive mixture comprising a phenol-aldehyde resin and a lignin material, wherein the adhesive mixture is a powder with a moisture content of less than about 10 wt % of the adhesive mixture.

18. The wood-based composite structure according to paragraph 17, wherein the adhesive mixture has an explosion constant ($K_{st}$) of less than about 300 bar m/s.

19. The wood-based composite structure according to paragraph 17 or 18, wherein the adhesive mixture has an explosion constant ($K_{st}$) of less than about 200 bar m/s.

20. The wood-based composite structure according to any one of paragraphs 17 to 19, wherein the adhesive mixture has a minimum ignition energy (MIE) of at least about 100 mJ.

21. The wood-based composite structure according to any one of paragraphs 17 to 20, wherein the adhesive mixture has a minimum ignition energy (MIE) of at least about 500 mJ.

22. The wood-based composite structure according to any one of paragraphs 17 to 22, wherein the lignin material is kraft lignin.

23. The wood-based composite structure according to any one of paragraphs 17 to 22, wherein the at least one aldehyde comprises formaldehyde.

24. The wood-based composite structure according to any one of paragraphs 17 to 23, wherein the at least one phenol comprises one or more polyphenols.

25. The wood-based composite structure according to any one of paragraphs 17 to 24, further comprising at least one filler.

26. The wood-based composite structure according to any one of paragraphs 17 to 25, further comprising at least one extender.

27. A method for preparing a non-explosive lignin blend comprising: providing a phenol-formaldehyde resin; combining a lignin material and the phenol-formaldehyde resin to form a mixture; and mixing the mixture to form the non-explosive lignin blend, wherein the non-explosive lignin blend is a powder with a moisture content of less than about 10 wt % of the non-explosive lignin blend.

28. The method according to paragraph 27, wherein the lignin material is kraft lignin.

29. The method according to paragraph 27 or 28, further comprising adding at least one additional powdered component to the mixture.

30. The method according to any one of paragraphs 27 to 29, wherein the at least one additional powdered component comprises corn flour, wheat flour, walnut shell flour, pecan shell flour, corn cob residue, or combinations thereof.

31. The method according to any one of paragraphs 27 to 30, wherein the non-explosive lignin blend has a minimum ignition energy (MIE) of at least about 100 mJ.

32. The method according to any one of paragraphs 27 to 31, wherein the non-explosive lignin blend has an explosion constant ($K_{st}$) of less than about 300 bar m/s.

33. The method according to any one of paragraphs 26 to 32, further comprising the step of adding at least one filler to the mixture.

34. The method according to any one of paragraphs 26 to 33, further comprising the step of adding at least one extender to the mixture.

35. An adhesive composition for bonding wood comprising a phenol-formaldehyde resin, wherein at least a portion of the phenol-formaldehyde resin of the adhesive composition has been replaced by one or more lignin materials.

36. The adhesive composition according to paragraph 35, wherein about 50% of the phenol-formaldehyde resin has been replaced by the one or more lignin materials.

37. A wood-based composite structure comprising: one or more wood-based composite panels; and an adhesive mixture comprising a phenol-formaldehyde resin and a lignin material.

38. The composite structure according to paragraph 37, wherein the lignin material comprises an aqueous liquid solution.

39. The composite structure according to paragraph 37 or 38, wherein the lignin material is kraft lignin.

40. The composite structure according to any one of paragraphs 37 to 39, wherein the lignin material is present in the adhesive mixture in an amount in the range of about 10 wt % to about 40 wt % of the adhesive mixture.

41. The composite structure according to any one of paragraphs 37 to 40, wherein the weight ratio of the lignin material to the phenol-formaldehyde resin is in the range of about 5:95 to about 40:60.

42. The composite structure according to any one of paragraphs 37 to 42, wherein a ratio of formaldehyde to phenol in the phenol-formaldehyde resin is in the range of about 1:10 to about 10:1.

43. The composite structure according to any one of paragraphs 37 to 42, wherein the adhesive mixture has a moisture content of less than about 15% by weight.

44. The composite structure according to any one of paragraphs 37 to 43, wherein the adhesive mixture has a moisture content of less than about 10% by weight.

45. The composite structure according to any one of paragraphs 37 to 44, wherein the adhesive mixture further comprises at least one filler.

46. The composite structure according to any one of paragraphs 37 to 45, wherein the adhesive mixture further comprises at least one extender.

47. An adhesive mixture comprising: an aldehyde; a phenol; and a lignin material.

48. The adhesive mixture according to paragraph 47, wherein there is substantially no reaction between the aldehyde and the lignin material within the adhesive mixture.

49. The adhesive mixture according to paragraph 47 or 48, wherein there is substantially no reaction between the phenol and the lignin material within the adhesive mixture.

50. The adhesive mixture according to any one of paragraphs 47 to 49, wherein the aldehyde and the phenol react to form a phenol-aldehyde resin within the adhesive mixture.

51. The adhesive mixture according to paragraph 50, wherein there is substantially no reaction between the phenol-aldehyde resin and the lignin material within the adhesive mixture.

52. A method for preparing a wood-based composite structure comprising: providing a first wood-based composite panel; and adding an adhesive to the first wood-based composite panel, the adhesive comprising a mixture of a phenol-formaldehyde resin and a lignin material.

53. The method according to paragraph 52, wherein the lignin material is present in the mixture in an amount in the range of about 10 wt % to about 40 wt % of the mixture.

54. The method according to paragraph 52 or 53, wherein the weight ratio of the lignin material to the phenol-formaldehyde resin in the mixture is in the range of about 5:95 to about 40:60.

55. The method according to any one of paragraphs 52 to 54, wherein a ratio of formaldehyde to phenol in the phenol-formaldehyde resin is in the range of about 1:10 to about 10:1.

56. The method according to any one of paragraphs 52 to 55, wherein the adhesive has a moisture content of less than about 15% by weight.

57. The method according to any one of paragraphs 52 to 56, wherein the lignin material is kraft lignin.

58. The method according to any one of paragraphs 52 to 57, wherein the adhesive further comprises at least one filler.

59. The method according to any one of paragraphs 52 to 58, wherein the adhesive further comprises at least one extender.

60. A method for preparing an adhesive comprising: providing a phenol-formaldehyde resin; combining a solid lignin material and the phenol-formaldehyde resin to form a mixture; and mixing the mixture to form the adhesive.

61. The method according to paragraph 60, wherein the adhesive is a solid.

62. The method according to paragraph 60 or 61, wherein no heat is applied during the step of mixing.

63. The method according to any one of paragraphs 60 to 62, wherein mixing is done at about ambient temperature.

64. The method according to any one of paragraphs 60 to 63, wherein the lignin material is present in the mixture in an amount in the range of about 10 wt % to about 40 wt % of the mixture.

65. The method according to any one of paragraphs 60 to 64, wherein the weight ratio of the lignin material to the liquid phenol-formaldehyde resin in the mixture is in the range of about 5:95 to about 40:60.

66. The method according to any one of paragraphs 60 to 65, wherein a ratio of formaldehyde to phenol in the liquid phenol-formaldehyde resin is in the range of about 1:10 to about 10:1.

67. The method according to any one of paragraphs 60 to 66, wherein the adhesive has a moisture content of less than about 15% by weight.

68. The method according to any one of paragraphs 60 to 67, wherein the lignin material is kraft lignin.

69. The method according to any one of paragraphs 60 to 68, further comprising the step of adding at least one filler to the mixture.

70. The method according to any one of paragraphs 60 to 69, further comprising the step of adding at least one extender to the mixture.

71. A method for preparing an adhesive comprising: providing a solid phenol-formaldehyde resin; combining a solid lignin material and the solid phenol-formaldehyde resin to form a mixture; and mixing the mixture to form the adhesive.

72. The adhesive according to paragraph 71, wherein the adhesive is a solid with a moisture content of less than about 10 wt % of the adhesive.

73. The method according to paragraph 71 or 72, wherein the lignin material is present in the mixture in an amount in the range of about 10 wt % to about 40 wt % of the mixture.

74. The method according to any one of paragraphs 71 to 73, wherein the weight ratio of the lignin material to the solid phenol-formaldehyde resin in the mixture is in the range of about 5:95 to about 40:60.

75. The method according to any one of paragraphs 71 to 74, wherein a ratio of formaldehyde to phenol in the solid phenol-formaldehyde resin is in the range of about 1:10 to about 10:1.

76. The method according to any one of paragraphs 71 to 75, wherein the solid phenol-formaldehyde resin has a moisture content of less than about 15% by weight of the resin.

77. The method according to any one of paragraphs 71 to 76, wherein the lignin material is kraft lignin.

78. The method according to any one of paragraphs 71 to 77, further comprising the step of adding at least one filler to the mixture.

79. The method according to any one of paragraphs 71 to 78, further comprising the step of adding at least one extender to the mixture.

80. A powdered kraft lignin with reduced explosivity as described herein.

81. A adhesive composition as described herein.

82. A method of preparing an adhesive composition as described herein.

83. A wood composite structure comprising an adhesive composition as described herein.

84. A lignin-containing mixture, comprising: a lignin material; and a phenol-aldehyde resin, wherein the mixture comprises less than 10 wt % of water.

85. A method for making a lignin-containing mixture, comprising: mixing a lignin material and a phenol-aldehyde resin to produce a mixture, wherein the mixture comprises less than 10 wt % of water.

86. A method for making a lignin-containing mixture, comprising: mixing an aqueous phenol-aldehyde resin and a lignin material to produce an aqueous suspension or dispersion; and drying the aqueous suspension or dispersion to produce a mixture comprising less than 10 wt % of water.

87. The method according to paragraph 86, wherein the aqueous suspension or dispersion is dried by spray-drying the aqueous suspension or dispersion.

88. The mixture or method according to any one of paragraphs 84 to 87, wherein the mixture has an explosion constant ($K_{st}$) of less than 300 bar m/s.

89. The mixture or method according to any one of paragraphs 84 to 88, wherein the mixture has an explosion constant ($K_{st}$) of less than 200 bar m/s.

90. The mixture or method according to any one of paragraphs 84 to 89, wherein the mixture has a minimum ignition energy (MIE) of at least 100 mJ.

91. The mixture or method according to any one of paragraphs 84 to 90, wherein the mixture has a minimum ignition energy (MIE) of at least 500 mJ.

92. The mixture or method according to any one of paragraphs 84 to 91, wherein the lignin material comprises kraft lignin.

93. The mixture or method according to any one of paragraphs 84 to 92, wherein a weight ratio of the lignin material to the phenol-aldehyde resin is about 5:95 to about 50:50, based on a dry weight of the mixture.

94. The mixture or method according to any one of paragraphs 84 to 93, wherein lignin material has an average particle size of about 1 µm to about 80 µm, and wherein the phenol-aldehyde resin has an average particle size of about 20 µm to about 200 µm.

95. The mixture or method according to any one of paragraphs 84 to 94, wherein the lignin material has a maximum particle size of 200 µm, and wherein the phenol-aldehyde resin has a maximum particle size of 500 µm.

96. The mixture or method according to any one of paragraphs 84 to 95, wherein the lignin material is a powder, and wherein the phenol-aldehyde resin is a powder.

97. The mixture or method according to any one of paragraphs 84 to 96, wherein the mixture comprises about 5 wt % to about 50 wt % of the lignin material and about 50 wt % to about 95 wt % of the phenol-aldehyde resin, and wherein an aqueous dispersion comprising about 25 wt % of the mixture has a pH of about 7 to about 14.

98. The mixture according to any one of paragraphs 84 or 88 to 97, further comprising (1) a filler, (2) an extender, or (3) a filler and an extender.

99. The method according to any one of paragraphs 85 to 97, further comprising mixing (1) a filler, (2) an extender, or (3) a filler and an extender with the lignin material and the phenol-aldehyde resin to produce the mixture.

100. The mixture or method according to paragraph 98 or 99, wherein the mixture comprises the extender, and wherein the extender comprises corn flour, soy flour, wheat flour, spray dried blood, or any mixture thereof.

101. The mixture or method according to any one of paragraphs 98 to 100, wherein the mixture comprises the filler, and wherein the filler comprises a nut shell, a seed shell, a fruit pit, an animal bone, an inorganic sulfate, a clay, a glass, an inorganic oxide, or any mixture thereof.

102. The mixture or method according to any one of paragraphs 84 to 87, wherein: a weight ratio of the lignin material to the phenol-aldehyde resin is about 5:95 to about 50:50, the lignin material comprises less than 10 wt % of water, the lignin material has an average particle size of about 1 µm to about 30 µm and a maximum particle size of 200 µm, the lignin material comprises kraft lignin, the phenol-aldehyde resin comprises less than 10 wt % of water, the phenol-aldehyde resin has an average particle size of about 30 µm to about 100 µm and a maximum particle size of 500 µm, the phenol-aldehyde resin comprises a phenol-formaldehyde resin, the mixture has an explosion constant ($K_{st}$) of less than 200 bar m/s, and the mixture has a minimum ignition energy (MIE) of at least 500 mJ.

103. A lignin-containing mixture, comprising: a powdered kraft lignin comprising less than 10 wt % of water and having an average particle size of about 1 µm to about 80 µm; and a powdered phenol-formaldehyde resin comprising less than 10 wt % of water and having an average particle size of about 20 µm to about 200 µm, wherein: the mixture comprises less than 10 wt % of water, a weight ratio of the powdered kraft lignin to the powdered phenol-formaldehyde resin is about 5:95 to about 50:50, based on a dry weight of the mixture, the mixture has an explosion constant ($K_{st}$) of less than 300 bar m/s, and the mixture has a minimum ignition energy (MIE) of at least 100 mJ.

104. The mixture or method according to any one of paragraphs 84 to 103, wherein the mixture comprises less than 7 wt % of water.

105. The mixture or method according to any one of paragraphs 84 to 104, wherein the mixture comprises less than 5 wt % of water.

106. The mixture or method according to any one of paragraphs 84 to 105, wherein the mixture comprises less than 4 wt % of water.

107. The mixture or method according to any one of paragraphs 84 to 106, wherein the mixture comprises less than 3 wt % of water.

108. The mixture or method according to any one of paragraphs 84 to 107, wherein the mixture comprises less than 2 wt % of water.

109. The mixture or method according to any one of paragraphs 84 to 108, wherein the mixture comprises less than 1 wt % of water.

110. The mixture or method according to any one of paragraphs 84 to 109, wherein the mixture comprises less than 0.5 wt % of water.

111. The mixture or method according to any one of paragraphs 84 to 110, wherein the mixture has an explosion constant ($K_{st}$) of about 5 bar m/s to about 295 bar m/s and a minimum ignition energy (MIE) of about 1,000 mJ to about 10,000 mJ.

112. The mixture or method according to any one of paragraphs 84 to 111, wherein the mixture has an explosion constant ($K_{st}$) of about 100 bar m/s to about 200 bar m/s and a minimum ignition energy (MIE) of about 1,000 mJ to about 10,000 mJ.

113. The mixture or method according to any one of paragraphs 84 to 112, wherein lignin material has an average particle size of about 1 µm to about 80 µm, and wherein the phenol-aldehyde resin has an average particle size of about 20 µm to about 200 µm.

114. The mixture or method according to any one of paragraphs 84 to 113, wherein lignin material has an average particle size of about 1 µm to about 30 µm, and wherein the phenol-aldehyde resin has an average particle size of about 10 µm to about 80 µm.

115. The mixture or method according to any one of paragraphs 84 to 114, wherein the lignin material has a maximum particle size of 200 µm, and wherein the phenol-aldehyde resin has a maximum particle size of 500 µm.

116. The mixture or method according to any one of paragraphs 84 to 115, wherein the lignin material has a maximum particle size of 80 µm, and wherein the phenol-aldehyde resin has a maximum particle size of 200 µm.

117. The mixture or method according to any one of paragraphs 84 to 116, wherein the lignin material comprises less than 3 wt %, less than 2.7 wt %, less than 2.5 wt %, less than 2.3 wt %, less than 2 wt %, less than 1.7 wt %, less than 1.5 wt %, less than 1.3 wt %, less than 1 wt %, less than 0.9 wt %, less than 0.8 wt %, less than 0.7 wt % less than 0.6 wt %, less than 0.5 wt %, less than 0.4 wt %, less than 0.3 wt %, less than 0.2 wt %, less than 0.1 wt %, less than 0.07 wt %, less than 0.05 wt %, or less than 0.02 wt % of ash, based on a dry weight of the lignin material.

118. The mixture or method according to any one of paragraphs 84 to 117, wherein the lignin material comprises less than 5 wt % of sulfur, less than 4.5 wt % of sulfur, less than 4 wt % of sulfur, less than 3.5 wt % of sulfur, less than 3 wt % of sulfur, less than 2.7 wt % of sulfur, less than 2.5 wt % of sulfur, less than 2.3 wt % of sulfur, less than 2 wt % of sulfur, less than 1.7 wt % of sulfur, or less than 1.5 wt % of sulfur.

119. The mixture or method according to any one of paragraphs 84 to 118, wherein the lignin material has a ratio of aromatic carbon atoms plus alkenic carbon atoms to aliphatic carbon atoms of about 1:1, about 1.3:1, about 1.5:1, about 1.7:1, about 2:1, about 2.3:1, about 2.5:1, or about 2.7:1 to about 3.5:1, about 3.7:1, about 4:1, about 4.3:1, about 4.5:1, about 4.7:1, about 5:1, about 5.3:1, about 5.5:1, about 5.7:1, or about 6:1, based on quantitative analysis of $^{13}$C NMR spectra of the lignin material.

120. The mixture or method according to any one of paragraphs 84 to 119, wherein the lignin material has a ratio of aromatic carbon atoms plus alkenic carbon atoms to aliphatic carbon atoms of at least 2.5:1, at least 2.7:1, at least 3:1, at least 3.3:1, at least 3.5:1, at least 3.7:1, at least 4:1, at least 4.3:1, at least 4.5:1, at least 4.7:1, or at least 5:1 to about 5.3:1, about 5.5:1, about 5.7:1, or about 6:1, based on quantitative analysis of $^{13}$C NMR spectra of the lignin material.

121. The mixture or method according to any one of paragraphs 84 to 120, wherein the lignin material and the phenol-aldehyde resin in the mixture are separate components that have not reacted to form a reaction product.

122. The mixture or method according to any one of paragraphs 84 to 121, wherein the lignin material and the phenol-aldehyde resin in the mixture are discrete components that have not reacted to form a reaction product.

123. The mixture or method according to any one of paragraphs 84 to 122, wherein the lignin material and the phenol-aldehyde resin cannot be represented by a single chemical formula.

124. The mixture or method according to any one of paragraphs 84 to 123, wherein the lignin material and the phenol-aldehyde resin are heterogeneously associated with one another.

125. The mixture or method according to any one of paragraphs 84 to 124, wherein the lignin material and the phenol-aldehyde resin are uniformly dispersed together.

126. The mixture or method according to any one of paragraphs 84 to 124, wherein the lignin material and the phenol-aldehyde resin are not uniformly dispersed together.

127. The mixture or method according to any one of paragraphs 84 to 126, wherein the lignin material and the phenol-aldehyde resin can be mechanically separated from one another.

128. The mixture or method according to any one of paragraphs 84 to 127, wherein the phenol-aldehyde resin comprises a phenol-formaldehyde resin.

129. The mixture or method according to paragraph 128, wherein the phenol-formaldehyde resin has a formaldehyde to phenol molar ratio of about 1.5:1 to about 3:1.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A lignin-containing mixture, comprising:
about 5 wt % to about 50 wt % of a lignin material and about 50 wt % to about 95 wt % of a phenol-aldehyde resin, based on a combined weight of the lignin material and the phenol-aldehyde resin, wherein:
the lignin material and the phenol-aldehyde resin are heterogeneously associated with one another,
the lignin material comprises less than 10 wt % of ash, as measured according to ASTM D2584-11, and
the mixture comprises less than 10 wt % of water.

2. The mixture of claim 1, wherein the mixture has an explosion constant ($K_{st}$) of less than 300 bar m/s, as measured according to ASTM E-1226-12A.

3. The mixture of claim 1, wherein the mixture has an explosion constant ($K_{st}$) of less than 200 bar m/s, as measured according to ASTM E-1226-12A, and a minimum ignition energy (MIE) of at least 500 mJ, as measured according to ASTM E-2019-03 (2013).

4. The mixture of claim 1, wherein the mixture has a minimum ignition energy (MIE) of at least 100 mJ, as measured according to ASTM E-2019-03(2013).

5. The mixture of claim 1, wherein the lignin material comprises kraft lignin.

6. The mixture of claim 1, wherein lignin material has an average particle size of about 1 µm to about 80 µm, and wherein the phenol-aldehyde resin has an average particle size of about 20 µm to about 200 µm.

7. The mixture of claim 1, wherein the lignin material has a maximum particle size of 200 μm, and wherein the phenol-aldehyde resin has a maximum particle size of 500 μm.

8. The mixture of claim 1, wherein the lignin material is a powder, and wherein the phenol-aldehyde resin is a powder.

9. The mixture of claim 1, wherein the mixture comprises about 5wt % to about 25 wt % of the lignin material and about 75 wt % to about 95 wt % of the phenol-aldehyde resin, based on the combined weight of the lignin material and the phenol-aldehyde resin.

10. The mixture of claim 1, further comprising (1) a filler, (2) an extender, or (3) a filler and an extender.

11. The mixture of claim 10, wherein the mixture comprises the extender, and wherein the extender comprises corn flour, soy flour, wheat flour, spray dried blood, or any mixture thereof.

12. The mixture of claim 10, wherein the mixture comprises the filler, and wherein the filler comprises a nut shell, a seed shell, a fruit pit, an animal bone, an inorganic sulfate, a clay, a glass, an inorganic oxide, or any mixture thereof.

13. The mixture of claim 1, wherein:
the lignin material comprises less than 3 wt % of water,
the lignin material has an average particle size of about 1 μm to about 30 μm and a maximum particle size of 200 μm,
the lignin material comprises kraft lignin,
the lignin material comprises less than 3 wt % of ash, as measured according to ASTM D2584-11,
the phenol-aldehyde resin comprises less than 3 wt % of water,
the phenol-aldehyde resin has an average particle size of about 30 μm to about 100 μm and a maximum particle size of 500 μm,
the phenol-aldehyde resin comprises a phenol-formaldehyde resin,
the mixture has an explosion constant ($K_{st}$) of less than 200 bar m/s, as measured according to ASTM E-1226-12A, and
the mixture has a minimum ignition energy (MIE) of at least 500 mJ, as measured according to ASTM E-2019-03(2013).

14. A lignin-containing mixture, comprising:
a powdered kraft lignin comprising less than 5 wt % of water and having an average particle size of about 1 μm to about 80 μm; and
a powdered phenol-formaldehyde resin comprising less than 5 wt % of water and having an average particle size of about 20 μm to about 200 μm, wherein:
the powdered kraft lignin and the phenol-aldehyde resin are heterogeneously associated with one another,
the powdered kraft lignin comprises less than 5 wt % of ash, as measured according to ASTM D2584-11,
the mixture comprises less than 10 wt % of water,
a weight ratio of the powdered kraft lignin to the powdered phenol-formaldehyde resin is about 5:95 to about 50:50, based on a dry weight of the mixture,
the mixture has an explosion constant ($K_{st}$) of less than 300 bar m/s, as measured according to ASTM E-1226-12A, and
the mixture has a minimum ignition energy (MIE) of at least 100 mJ, as measured according to ASTM E-2019-03(2013).

15. A method for making a lignin-containing mixture, comprising:
mixing a lignin material and a phenol-aldehyde resin to produce a mixture comprising about 5 wt % of the lignin material and about 50 wt % to about 95 wt % of the phenol-aldehyde resin, based on a combined weight of the lignin material and the phenol-aldehyde resin, wherein:
the lignin material and the phenol-aldehyde resin are heterogeneously associated with one another,
the lignin material comprises less than 10 wt % of ash, as measured according to ASTM D2584-11, and
the mixture comprises less than 10 wt % of water.

16. The method of claim 15, wherein:
the lignin material has an average particle size of about 1μm to about 30 μm,
the phenol-aldehyde resin has an average particle size of about 30 μm to about 100 μm,
the lignin material comprises kraft lignin comprising less than 10 wt % of water, and
the phenol-aldehyde resin comprises less than 10 wt % of water.

17. The method of claim 15, further comprising mixing (1) a filler, (2) an extender, or (3) a filler and an extender with the lignin material and the phenol-aldehyde resin to produce the mixture.

18. The method of claim 15, wherein the mixture has a minimum ignition energy (MIE) of at least 100 mJ, as measured according to ASTM E-2019-03(2013), and an explosion constant ($K_{st}$) of less than 300 bar m/s, as measured according to ASTM E-1226-12A.

19. The mixture of claim 1, further comprising (1) a filler, (2) an extender, or (3) a filler and an extender, wherein the lignin material has an average particle size of about 1 μm to about 80 μm and a maximum particle size of 200 μm, and wherein the phenol-aldehyde resin has an average particle size of about 20 μm to about 200 μm and a maximum particle size of 500 μm.

20. The mixture of claim 1, further comprising (1) a filler, (2) an extender, or (3) a filler and an extender, wherein:
the extender comprises corn flour, soy flour, wheat flour, spray dried blood, or any mixture thereof,
the filler comprises a nut shell, a seed shell, a fruit pit, or any mixture thereof,
the lignin material has an average particle size of about 1 μm to about 80 μm and a maximum particle size of 200,
the phenol-aldehyde resin has an average particle size of about 20 μm to about 200 μm and a maximum particle size of 500 μm, and
the mixture comprises about 5 wt % to about 15 wt % of the lignin material and about 85wt % to about 95 wt % of the phenol-aldehyde resin, based on the combined weight of the lignin material and the phenol-aldehyde resin.

* * * * *